(12) United States Patent
Fujiki et al.

(10) Patent No.: US 8,247,137 B2
(45) Date of Patent: Aug. 21, 2012

(54) FUEL CELL AND PRODUCTION OF FUEL CELL STACK

(75) Inventors: Akira Fujiki, Yokohama (JP); Yukihiro Maekawa, Yokohama (JP); Takeharu Kuramochi, Yokohama (JP); Masahiko Katsu, Ayase (JP); Takayuki Hirao, Yokohama (JP); Takeshi Shimizu, Billancourt (FR); Masanori Iwamoto, Yokohama (JP); Sadao Miki, Kawasaki (JP); Haruhiko Suzuki, Zama (JP); Yoshiki Muto, Zama (JP); Kaoru Eguchi, Tokyo (JP); Masahiro Omata, Yokohama (JP); Hiroshi Saitou, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/158,156

(22) Filed: Jun. 10, 2011

(65) Prior Publication Data

US 2011/0236801 A1    Sep. 29, 2011

Related U.S. Application Data

(62) Division of application No. 10/579,907, filed as application No. PCT/JP2004/016387 on Oct. 28, 2004, now Pat. No. 7,981,572.

(30) Foreign Application Priority Data

Nov. 20, 2003 (JP) .................................. 2003-391044
May 20, 2004 (JP) .................................. 2004-150157

(51) Int. Cl.
*H01M 8/00* (2006.01)
*H01M 8/04* (2006.01)
*H01M 8/10* (2006.01)

(52) U.S. Cl. ........ 429/535; 429/514; 429/513; 429/512; 429/479; 429/483

(58) Field of Classification Search .................. 429/535, 429/514, 513, 512, 479, 483
See application file for complete search history.

(56) References Cited

U.S. PATENT DOCUMENTS

2006/0216563 A1    9/2006    Matsunaga

FOREIGN PATENT DOCUMENTS

| | | |
|---|---|---|
| EP | 1 341 252 A1 | 9/2003 |
| GB | 2 023 063 A | 12/1979 |
| JP | 07-249417 | 9/1995 |
| JP | 08-007915 A | 1/1996 |
| JP | 08-273693 | 10/1996 |
| JP | 2000-048850 | 2/2000 |
| JP | 2001-023665 | 1/2001 |
| JP | 2001-057226 A | 2/2001 |
| JP | 2001-236971 A | 8/2001 |
| JP | 2003-086230 A | 3/2003 |
| JP | 2003-086232 | 3/2003 |
| JP | 2003-163011 A | 6/2003 |

*Primary Examiner* — Helen O Conley
(74) *Attorney, Agent, or Firm* — Foley & Lardner LLP

(57) ABSTRACT

Separators (5A, 5B, 6) and membrane-electrode assemblies (2) of a fuel cell stack (1) are alternately stacked in a guide box (40). The separators (5A, 5B, 6) each have groove-like gas paths (10A, 10B). Powder of an adhesive agent (7) is adhered in advance to the surfaces of the separators (5A, 5B, 6), except the gas paths (10A, 10B), through photosensitive drums (31A, 31B) to which the powder is adsorbed in a given pattern. The separators (5A, 5B, 6) and the membrane-electrode assemblies (2), stacked in the guide box (40), are heated and compressed by a press (43) and heaters (40C) to obtain a unitized fuel cell stack (1).

9 Claims, 9 Drawing Sheets

US 8,247,137 B2

FUEL CELL AND PRODUCTION OF FUEL CELL STACK

RELATED APPLICATIONS

This application is a Divisional of U.S. patent application Ser. No. 10/579,907, which is a National Stage of International Application No. PCT/JP2004/016387, filed Oct. 28, 2004, which claims priority to Japan Application No. 2004-150157, filed May 20, 2004, and 2003-391044, filed Nov. 20, 2003, the disclosures of which have been incorporated by reference herein in their entirety.

FIELD OF THE INVENTION

This invention relates to a fuel cell and production of a fuel cell stack.

BACKGROUND OF THE INVENTION

JP2001-57226A, published by the Japan Patent Office in 2001, discloses a fuel cell and a fuel cell stack production method employing a cylindrical intermediate adapter. In this method, through-holes are formed in membrane-electrode assemblies (MEA) and separators, and the membrane-electrode assemblies (MEA) and the separators are alternately stacked, while passing the cylindrical intermediate adapter through the through-holes, thereby obtaining a fuel cell. Further, after production of multiple fuel cells, a shaft is allowed to pass through the intermediate adapters, to thereby obtain the fuel cell stack in which the multiple fuel cells are stacked.

JP2001-236971A, published by the Japan Patent Office in 2001 discloses a method in which, while the MEA is formed as a sheet, a first separator and a second separator are arranged at a given interval on the sheet, and the fuel cells are successively produced while feeding out those sheets. In this production method, each of the sheets are fed out so that the MEA and the first separator, and the MEA and the second separator are stacked, respectively, and those sheets are thermally compressed at a given position from outside. As a result, the first separator and the second separator are fitted to the MEA by pressure, to thereby successively obtain the fuel cells.

JP2003-163011A, published by the Japan Patent Office in 2003, discloses an MEA production method in which, while feeding out a film-like electrolyte membrane, electrode material powder is transferred in the midway from a drum to the electrolyte membrane, thereby producing the MEA.

SUMMARY OF THE INVENTION

In the production method according to JP2001-57226A, it is necessary to form the through-holes in the MEAs and the separators in advance, and the process of forming the through-holes involves a high cost. Further, an effective area of the fuel cells is reduced due to the through-holes.

The production methods of JP2001-236971A and JP2003-163011A are designed only for the production of unitary fuel cells, and are not applicable to the production of the fuel cell stack. In addition, to feed out the electrolyte membrane, a number of rollers rotating in synchronism with each other are used in those methods, with the result that a rotation control device for those rollers involves a high cost. Further, when feeding the electrolyte membrane by using the rollers, there is a fear of the surface of the electrolyte membrane being flawed or being adhered with foreign matters.

It is, therefore, an object of this invention to produce a fuel cell stack at low cost.

It is another object of this invention to prevent generation of a flaw or adhesion of foreign matters when feeding an electrolyte membrane in a form of a film or a sheet.

In order to achieve the above objects, this invention provides a method of producing a fuel cell stack comprising multiple stack materials stacked in a given order. The method comprises a process for stacking the stack materials in the given order in a guide box through intermediation of an adhesive to be solidified through heating, and a process for integrating the stack materials by heating and compressing the stack materials stacked in the guide box.

This invention also provides an apparatus for producing a fuel cell stack comprising multiple stack materials stacked in a given order. The apparatus comprises a guide box that stacks the stack materials in a given order in the guide box through intermediation of an adhesive to be solidified through heating, and a mechanism for heating and compressing the stack materials stacked in the guide box.

Still further, this invention provides a method of producing a fuel cell having an electrolyte membrane being held between a pair of separators. The production method comprises a separator arrangement process for causing the pair of separators to be opposed to each other with a given gap therebetween, and an electrolyte membrane intrusion process for causing the electrolyte membrane to enter the gap by applying a conveyance airflow to both sides of the electrolyte membrane.

Still further, this invention provides an apparatus for producing a fuel cell having an electrolyte membrane being held between a pair of separators. The production method comprises a separator conveyor for causing the pair of separators to be opposed to each other with a given gap therebetween, and a pair of conveying nozzles for causing the electrolyte membrane to enter the gap by applying a conveyance airflow to both sides of the electrolyte membrane.

The details as well as other features and advantages of this invention are set forth in the remainder of the specification and are shown in the accompanying drawings.

DESCRIPTION OF THE PREFERRED EMBODIMENTS

Figure 4:
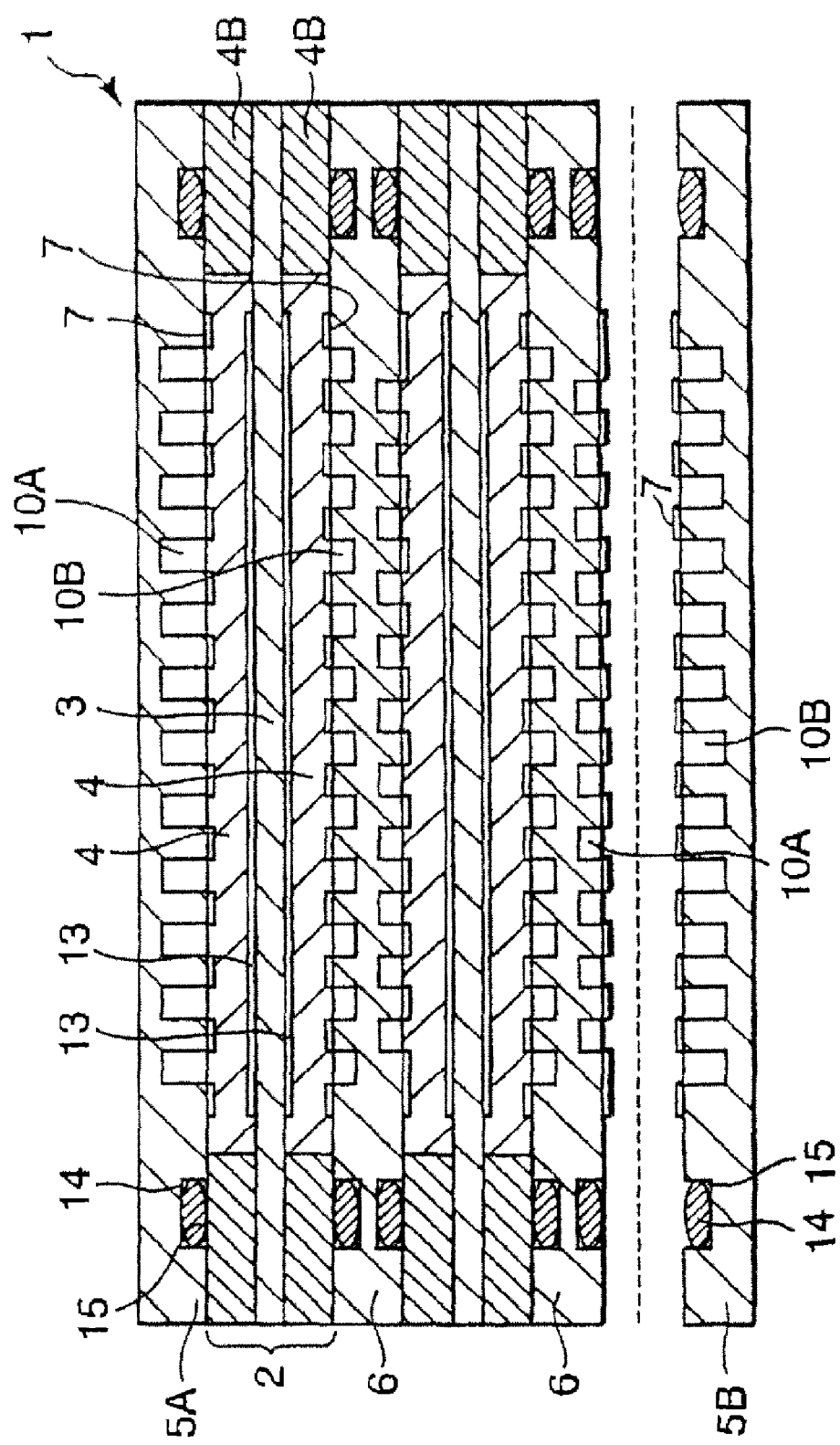
FIG. 4 is a longitudinal sectional view of a main portion of a fuel cell stack produced by the fuel cell stack producing apparatus.

Referring to FIG. 4 of the drawings, a fuel cell stack 1 produced by a fuel cell stack producing apparatus according to a first embodiment of this invention will be described.

The fuel cell stack 1 is provided with membrane-electrode assemblies (MEA) 2, each of which is formed by coating both sides of a solid polymer electrolyte membrane 3 with catalyst layers 13 constituting an anode and a cathode, and further covering the catalyst layers 13 with gas diffusion layers (GDL) 4.

The solid polymer electrolyte membrane 3 is formed by a perfluoro ethylene sulfonate resin film. The catalyst layers 13 are mainly formed of platinum, and are used to coat central regions of the solid polymer electrolyte membrane 3.

The GDLs 4 are formed of a carbon cloth or a carbon paper that has undergone a water repellency treatment, and are attached to the inner sides of frames 4B. The GDLs 4 are firmly attached to the solid polymer electrolyte membrane 3 so as to cover the catalyst layers 13 by a fixing effect obtained by an electrolyte solution or by a partial thermal adhesion by a thermosetting adhesive. In the following description, the GDL 4 covering the anode will be referred to as anode side GDL 4, and the GDL 4 covering the cathode will be referred to as the cathode side GDL 4.

The MEAs 2 are alternately stacked with separators 5A, 5B or 6.

The separators 6 are intermediate separators existing between the MEAs 2, and the separators 5A and 5B are end separators respectively arranged at both ends of the fuel cell stack 1.

Each intermediate separator 6 has a groove-like anode gas path 10A facing the anode side GDL 4 of the MEA 2, and a groove-like cathode gas path 10B facing the cathode side GDL 4 of the adjacent MEA 2. The end separator 5A has only the anode gas path 10A, and the end separator 5B has only the cathode gas path 10B. The separators 5A, 5B, and 6 are formed by compression molding of a mixture of graphite powder and plastic powder through heat press using a mold, or by press molding of an expansion graphite sheet. It is also possible to form the separators 5A, 5B, and 6 of a metal material. By using a metal material, it is possible to obtain desirable effects of reducing electrical resistance, lowering gas permeability, enhancing mechanical strength, and reducing thickness. However, since the separators are exposed to both an oxidizing atmosphere and a reducing atmosphere, it is necessary to secure corrosion resistance by using a corrosion resistant metal or through a surface treatment such as metal plating. The separators 5A, 5B, and 6 are fixed to the GDLs 4 by using an adhesive 7. The adhesive 7 contains as a main component a thermosetting resin of phenol type or epoxy type, and the adhesion of the separators 5A, 5B, and 6 to the GDLs 4 is effected through hot press.

A hydrogen-rich gas is supplied to the anode gas path 10A of the separators 5A and 6. Air is supplied to the cathode gas path 10B of the separators 5B and 6. Seal grooves 15 are formed in the outer periphery of the separators 5A, 5B, and 6. Seal members 14 are arranged in the seal grooves 15. The seal members 14 are in contact with the frames 4B of the GDLs 4, whereby gas leakage from the anode gas paths 10A and the cathode gas paths 10B is prevented.

In this way, the fuel cell stack 1 is formed by alternately stacking a given number of MEAs 2 and intermediate separators 6 between the separators 5A and 5B. Further, these stacked components are fastened in the stacking direction by bolts and nuts via the end plates.

Next, an apparatus for producing the above fuel cell stack 1 will be described.

Figure 1:
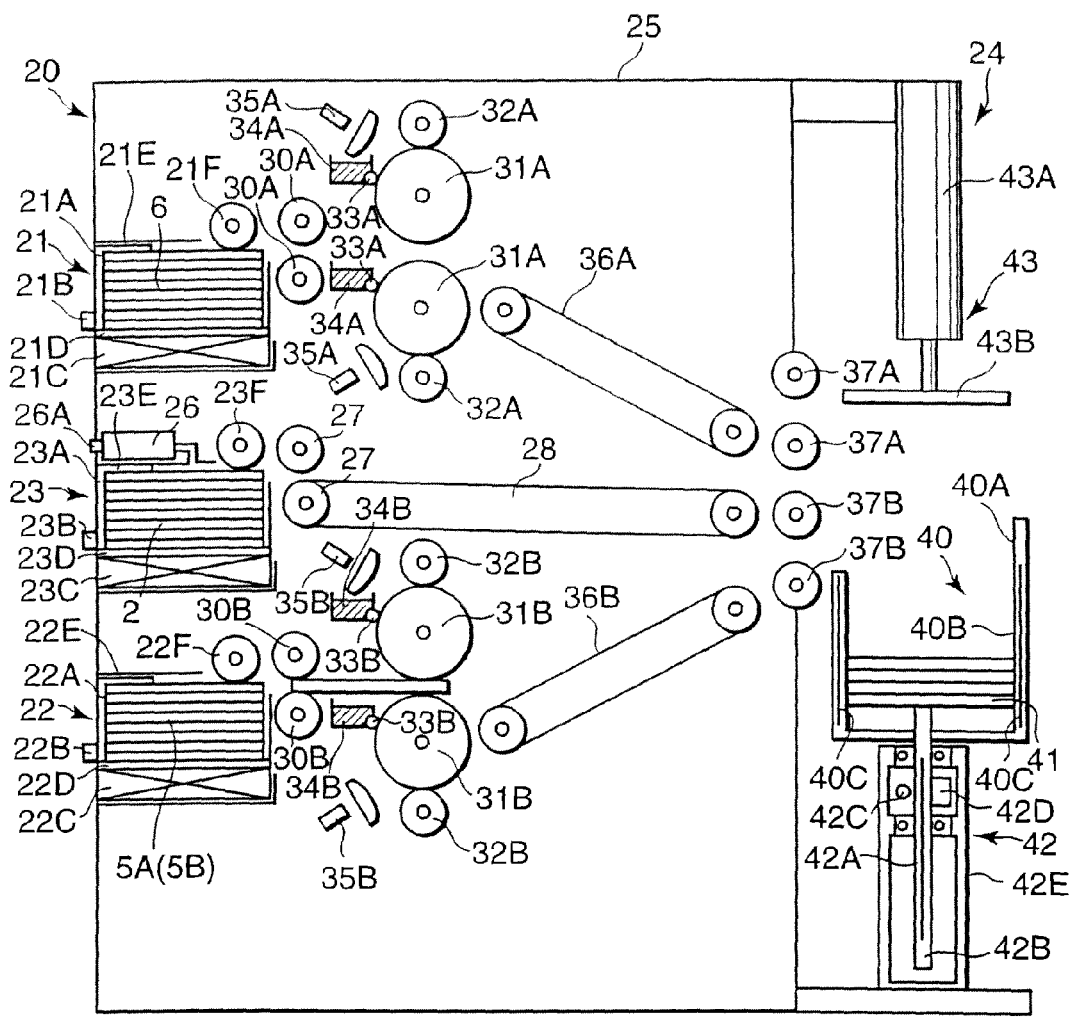
FIG. 1 is a schematic longitudinal sectional view of a fuel cell stack producing apparatus according to this invention.

Referring to FIG. 1, the fuel cell stack producing apparatus according to the first embodiment of this invention is composed of a stack material supply unit 20 formed in a case 25, and a stack forming unit 24 situated outside the case 25.

The stack material supply unit 20 is equipped with an intermediate separator supply unit 21, an end separator supply unit 22, and an MEA supply unit 23.

Figure 2:
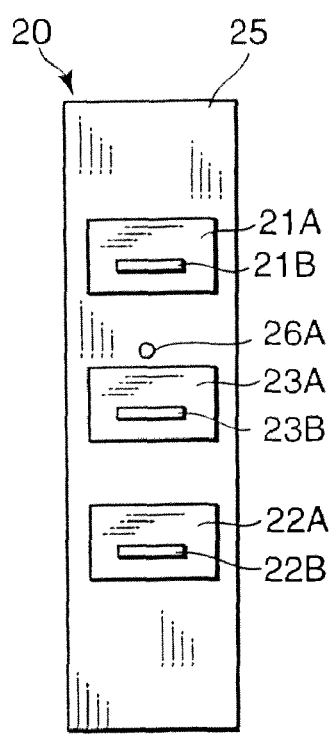
FIG. 2 is a schematic rear view of the fuel cell stack producing apparatus.

The intermediate separator supply unit 21 is equipped with a cassette 21A storing intermediate separators 6. The cassette 21A is carried into the case 25 via a slide rail through an opening formed in the rear surface of the case 25 as shown in FIG. 2. A grip 21B for carrying-in and carrying-out is mounted to the cassette 21A. The cassette 21A has at its bottom a bearer 21D upwardly urged by a spring 21C. The intermediate separators 6 are superimposed one upon the other on the bearer 21D, and the uppermost intermediate separator is in contact with a stopper 21E mounted to the upper portion of the cassette 21A. The intermediate separator supply unit 21 is equipped with a send-out roller 21F for sending out the uppermost intermediate separator 6. The cassette 21A has an opening for sending out from the cassette 21A the uppermost intermediate separator 6 as the send-out roller 21F rotates.

The intermediate separator supply unit 21 has, in front of the opening of the cassette 21A, a pair of charging rollers 30A and a pair of photosensitive drums 31A.

The charging roller 30A imparts positive charge to the intermediate separator 6 sent out by the send-out roller 21F through corona discharge according to high voltage power supplied from outside. The pair of photosensitive drums 31A are resin drums whose surfaces are coated with amorphous selenium or zinc oxide and which are respectively in contact with charging rollers 32A. The charging rollers 32A imparts negative charge to the photosensitive drums 31A through corona discharge according to high voltage power supplied from outside.

The intermediate separator supply unit 21 is equipped with a pair of laser oscillators 35A facing the photosensitive drums 31A. The laser oscillators 35A perform scanning in the directions of the rotation axes of the photosensitive drums 31A with laser beams passed through optical lenses. When, as scanning is performed with the laser beams, the photosensitive drums 31A are rotated, the charge on the surface of the photosensitive drums 31A that have undergone scanning is lost. Further, through flashing control of the laser beams, it is possible to form charge-less portions in an arbitrary pattern on the surfaces of the photosensitive drums 31A.

This combination of the laser oscillators 35 and the photosensitive drums 31A is well known as a laser scanner unit. In the fuel cell stack producing apparatus, charge-less portions are formed at positions where the adhesive 7 adheres except for the anode gas paths 10A and the cathode gas paths 10B.

The intermediate separator supply unit 21 is equipped with powder rollers 33A held in contact with the photosensitive drums 31A. The powder rollers 33A are provided with powder containers 34A storing negatively charged thermosetting adhesive powder, and cause thermosetting adhesive powder to adhere to the charge-less portions of the photosensitive drums 31A as these rotate. The remaining portions of the surfaces of the photosensitive drums 31A are negatively charged, so that no thermosetting adhesive powder, which is also negatively charged, adheres thereto.

Figure 3:
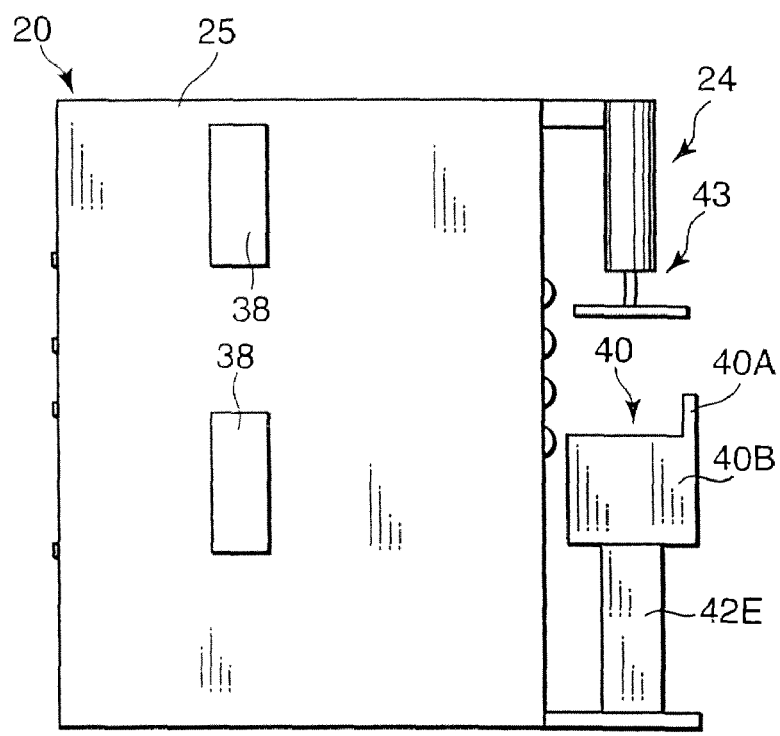
FIG. 3 is a schematic side view of the fuel cell stack producing apparatus.

When the photosensitive drums 31A, to the charge-less portions of which thermosetting adhesive powder adheres, come into contact with the intermediate separator 6, which is positively charged, the negatively charged thermosetting adhesive powder adheres to the surface of the intermediate separator 6. In this way, thermosetting adhesive powder adheres to the surface of the intermediate separator 6 in a given pattern. As shown in FIG. 3, to supply thermosetting adhesive powder to the powder containers 34A, there are formed, in a side surface of the case 25, adhesive powder supply ports 38 that can be closed.

The intermediate separator supply unit 21 conveys the intermediate separator 6 with thermosetting adhesive powder adhering thereto by means of a conveying belt 36A, and sends it out to the stack forming unit 24 through a gap between a pair of discharge rollers 37A installed in an opening of the casing 25 facing the stack forming unit 24.

The MEA supply unit 23 is situated directly below the intermediate separator supply unit 21. The MEA supply unit 23 is equipped with a cassette 23A storing MEAs 2. The cassette 23A is of substantially the same construction as the cassette 21A, and is equipped with a grip 23B, a spring 23C, a bearer 23D, a stopper 23E, and a send-out roller 23F. The cassette 23A is further equipped with a humidifier 26. The humidifier 26 vaporizes water supplied from a water intake port 26A provided in the rear surface of the case 25 shown in FIG. 2, and supplies steam to the MEA 2 situated at the uppermost position in the cassette 23A, placing the MEA 2 in a desirable moistened state.

The MEA supply unit 23 sends the MEA 2 humidified by the humidifier 26 to the exterior of the cassette 23A by the send-out roller 23F. The MEA supply unit 23 has, in front of the cassette 23A, a pair of other send-out rollers 27, and a conveying belt 28 wrapped around one send-out roller 27. The MEA 2 conveyed by the send-out rollers 27 and the conveying belt 28 is send out to the stack forming unit 24 through a gap between discharge rollers 37A and 37B installed in the opening of the case 25 facing the stack forming unit 24.

The end separator supply unit 22 is situated directly below the MEA supply unit 23. The construction of the end separator supply unit 22 is the same as that of the intermediate separator supply unit 21. Thus, it has a cassette 22A equipped with a grip 22B, a spring 22C, a bearer 22D, a stopper 22E, and a send-out roller 22F. End separators 5A and 5B are alternately stored in the cassette 22A. Further, to cause thermosetting adhesive powder to adhere to the surfaces of the end separators 5A and 5B in a given pattern, the end separator supply unit 22 is equipped with a pair of charging rollers 30B, a pair of photosensitive drums 31B, a pair of charging rollers 32B, a pair of laser emitters 35B, and a pair of powder rollers 33B equipped with powder containers 34B. Of these components provided in pairs, those situated on the upper side are used for the end separators 5B, and those situated on the lower side are used for the end separators 5A.

The end separator supply unit 22 is equipped with a conveying belt 36B for sending out end separators 5A and 5B with thermosetting adhesive powder adhering thereto.

The end separator 5A or 5B conveyed by the conveying belt 36B is sent out to the stack forming unit 24 through a gap between a pair of discharge rollers 37B installed in the opening of the case 25 facing the stack forming unit 24. In the following description, the intermediate separator 6, the MEA 2, and the end separators 5A and 5B sent out from the opening of the case 25 will be generally referred to as the stack materials.

The stack forming unit 24 is equipped with a guide box 40 in which the stack materials sent out of the case 25 in a given order are stacked in the stated order, an ascent/descent table 41 caused to ascend and descend by an ascent/descent device 42 provided at the bottom of the guide box 40, and a press 43 which, when the amount of stack materials in the guide box 40 reaches a given amount, cooperates with the ascent/descent table 41 to exert a compressive force on the stack materials.

The guide box 40 is composed of a positioning protrusion 40A adapted to abut the leading edge of a stack material sent out of the case 25 to effect positioning thereon, a box portion 40B with a rectangular horizontal section having the positioning protrusion 40A as one side thereof, and heaters 40C provided in the box portion 40B. The stack materials, whose leading edges abut the positioning protrusion 40A, are sequentially stacked within the box portion 40B, and are compressed by the press 43 while being heated by the heaters 40C to be thereby unitized.

At the initial stage of the stacking process, the ascent/descent table 41 is at the raised position, and, as the stacking of the stack materials proceeds, is lowered each time by a distance corresponding to the thickness of a stack material to be controlled so as to maintain the upper end of the stack materials stacked constantly at the same height. The ascent/descent device 42 is composed of an ascent/descent rod 42B supporting the ascent/descent table 41, a rack 42A integrated with the ascent/descent rod 42B, a pinion 42C in mesh with the rack 42A, and an electric motor 42D adapted to rotate the pinion 42C and mounted to a stand 42E. When the electric motor 42D rotates the pinion 42C, the rack 42A in mesh with the pinion 42C makes a relative displacement in a vertical direction together with the ascent/descent rod 42B with respect to the stand 42E, with the result that the ascent/descent table 41 ascends or descends. As the ascent/descent device 42, it is also possible to use a screw type ascent/descent mechanism or an ascent/descent mechanism using a linear cylinder.

The press 43 is equipped with a press head 43B adapted to ascend and descend as an air cylinder 43A expands and contracts. The press head 43B is equipped with a rectangular pressing surface to be fitted into the interior of the guide box 40.

The fuel cell stack 1 of which the stacking has been completed by the press head 43B and the heaters 43C is extracted from the guide box 40 through ascent operation of the ascent/descent table 41. In this process, in order that the raised fuel cell stack 1 and the press head 43B may not interfere with each other, the ascent position of the press head 43B is set and, further, the stroke distance is set taking into consideration the compressed position of the stacked body.

Next, with reference to FIGS. 5 through 8, a fuel cell stack production process by the fuel cell stack producing apparatus will be described. Prior to the production process, intermediate separators 6, MEAs 2, and end separators 5A and 5B are previously stored in the cassettes 21A through 23A, and the charging rollers 30A, 30B, 32A and 32B, and thermosetting adhesive powder are previously charged positively or negatively. In the stack forming unit 24, the ascent/descent table 41 and the press head 43B are both held at the raised position. The seal members 14 are previously fitted into the seal grooves 15 of the respective stack materials. In the MEA supply unit 23, the MEA 2 is appropriately humidified by the humidifiers 26.

Figure 5:
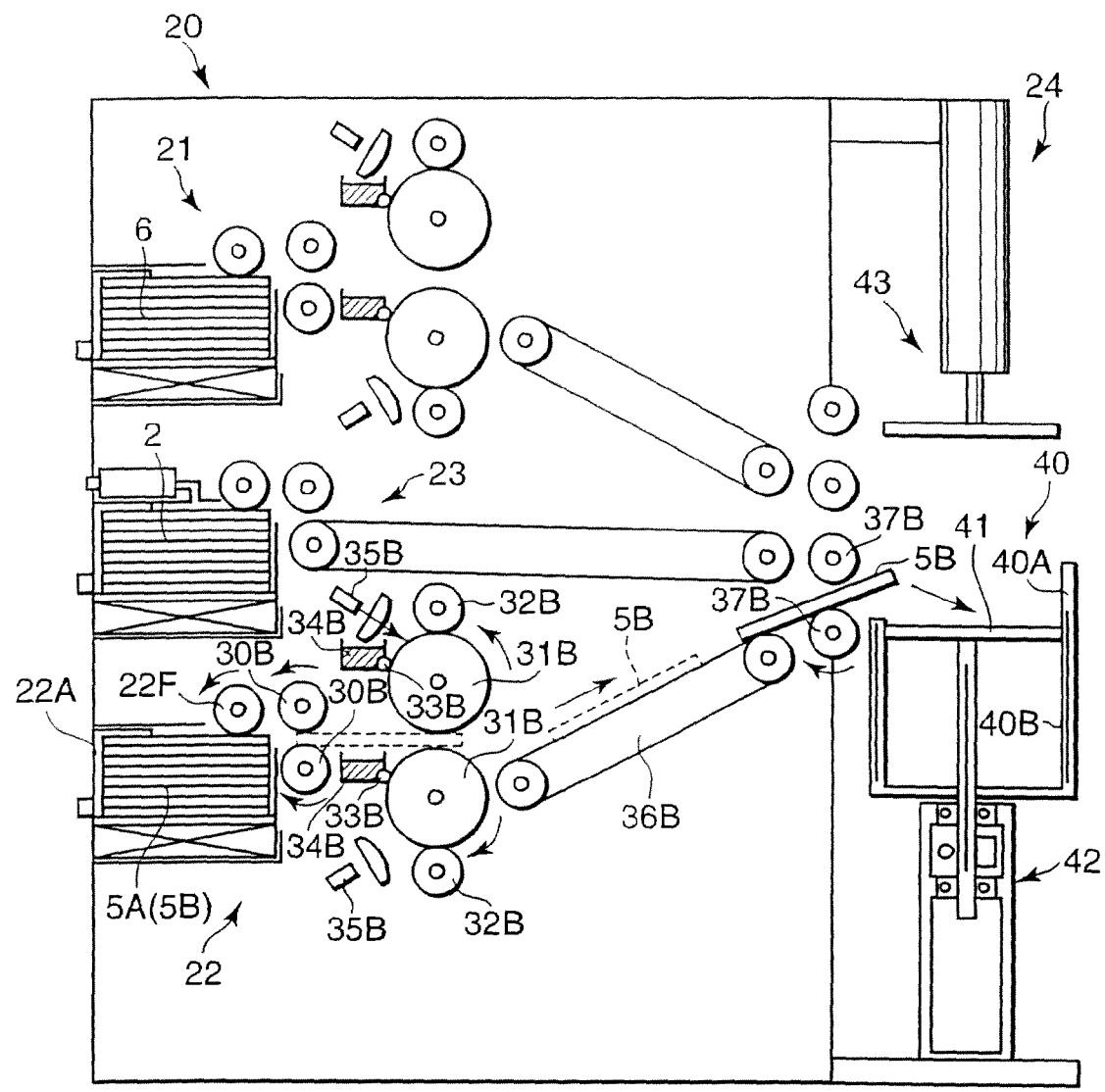
FIG. 5 is a schematic longitudinal sectional view of the fuel cell stack producing apparatus, illustrating an end separator stacking operation.

Referring to FIG. 5, the fuel cell stack producing apparatus first operates the end separator supply unit 22, and operates the send-out roller 22F to send out the end separator 5B to the position between the pair of charging rollers 30B, positively charging the surface of the end separator 6B by the charging roller 30B. On the other hand, at the photosensitive drums 31B, thermosetting adhesive powder is caused to adhere to the surfaces of the drums in a given pattern by the charging rollers 32B, the laser emitters 35B, and the powder rollers 33B.

Here, as shown in FIG. 4, the surface of the end separator 5B bonded to the MEA 2 is the upper surface only. Thus, regarding the end separator 5B, the end separator supply unit 22 operates, of the charging rollers 30B and 32B, the photosensitive drums 31B, the powder rollers 33B, and the laser emitters 35B, provided in pairs, only those situated on the upper side, causing thermosetting adhesive powder to adhere solely to the upper surface of the end separator 5B. Here, it is to a given region of the upper surface of the end separator 5B surrounded by the seal groove 15, exclusive of the cathode gas path 10B, that the thermosetting adhesive powder is caused to adhere.

After thermosetting adhesive powder has been thus caused to adhere to the given portions of the upper surface and lower surface thereof, the end separator 5B sent out from between the pair of photosensitive drums 31B is conveyed by the conveying belt 36B, and sent out to a position above the ascent/descent table 41 in the guide box 40 of the stack forming unit 24 through the gap between the pair of discharge rollers 37B installed in the opening of the case 25. At this time, the positioning protrusion 40A abuts the leading edge of the end separator 5B to effect positioning on the end separator 5B.

When the end separator 5B is placed on the ascent/descent table 41, the ascent/descent device 42 lowers the ascent/descent table 41 by a distance corresponding to the thickness of the end separator 5B. As a result, the upper surface of the end separator 5B is supported at the same height as the upper surface of the ascent/descent table 41 shown in the figure.

Figure 6:
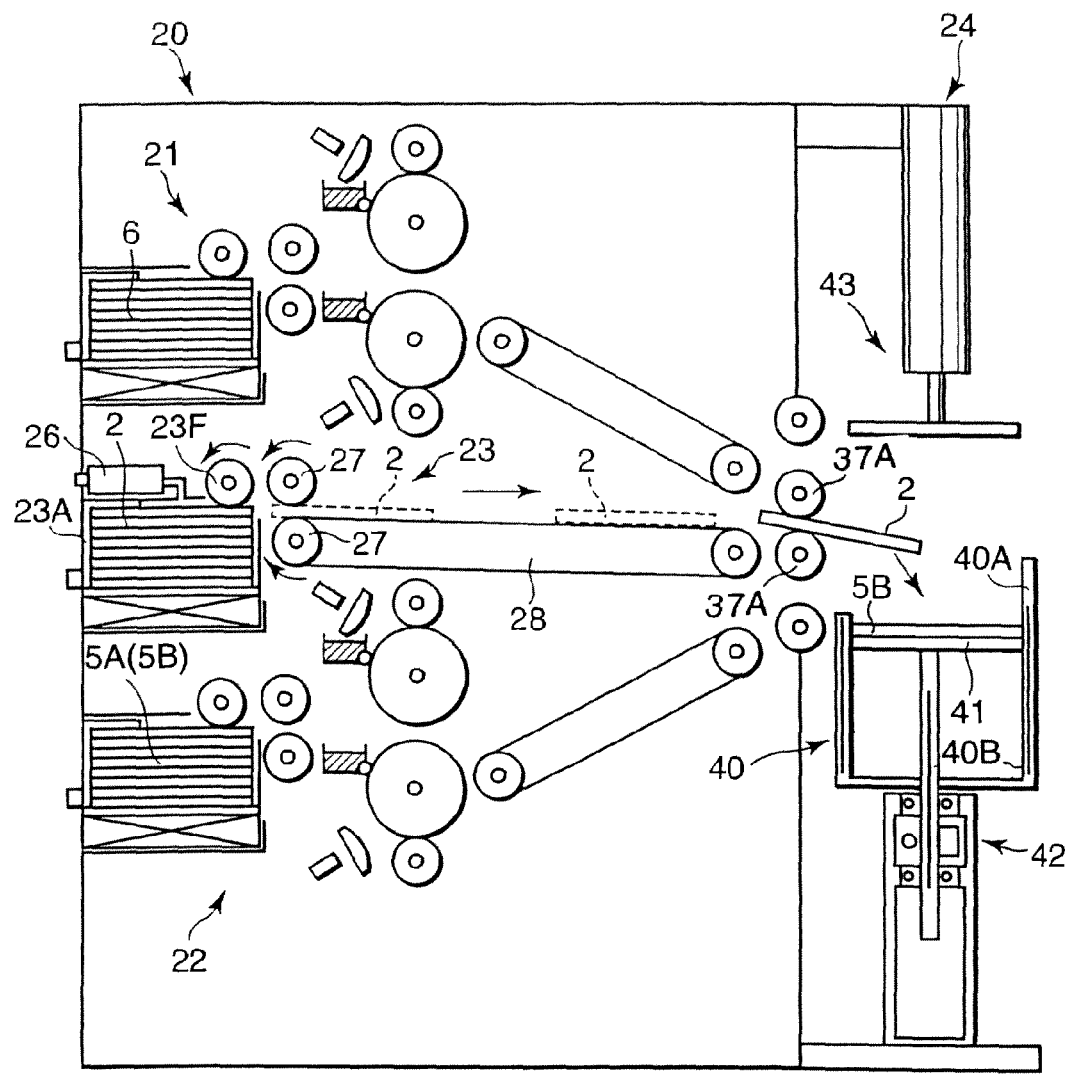
FIG. 6 is a schematic longitudinal sectional view of the fuel cell stack producing apparatus, illustrating an MEA stacking operation.

Referring to FIG. 6, the fuel cell stack producing apparatus then operates the MEA supply unit 23, and operates the send-out roller 23F to send the uppermost MEA 2 in the cassette 23A to the exterior of the cassette 23A. Further, the pair of send-out rollers 27 and the conveying belt 28 are operated to send out the MEA 2 to a position above the end separator 5B in the guide box 40 through the gap between the discharge rollers 37A and 37B installed in the opening of the case 25. At this time, the positioning protrusion 40A abuts the leading edge of the MEA 2 to effect positioning on the MEA 2.

When the MEA 2 is placed on the end separator 5B, the ascent/descent device 42 lowers the ascent/descent table 41 by a distance corresponding to the thickness of the MEA 2. As a result, the upper surface of the MEA 2 is supported at the same height as the upper surface of the end separator 5B shown in the figure.

Figure 7:
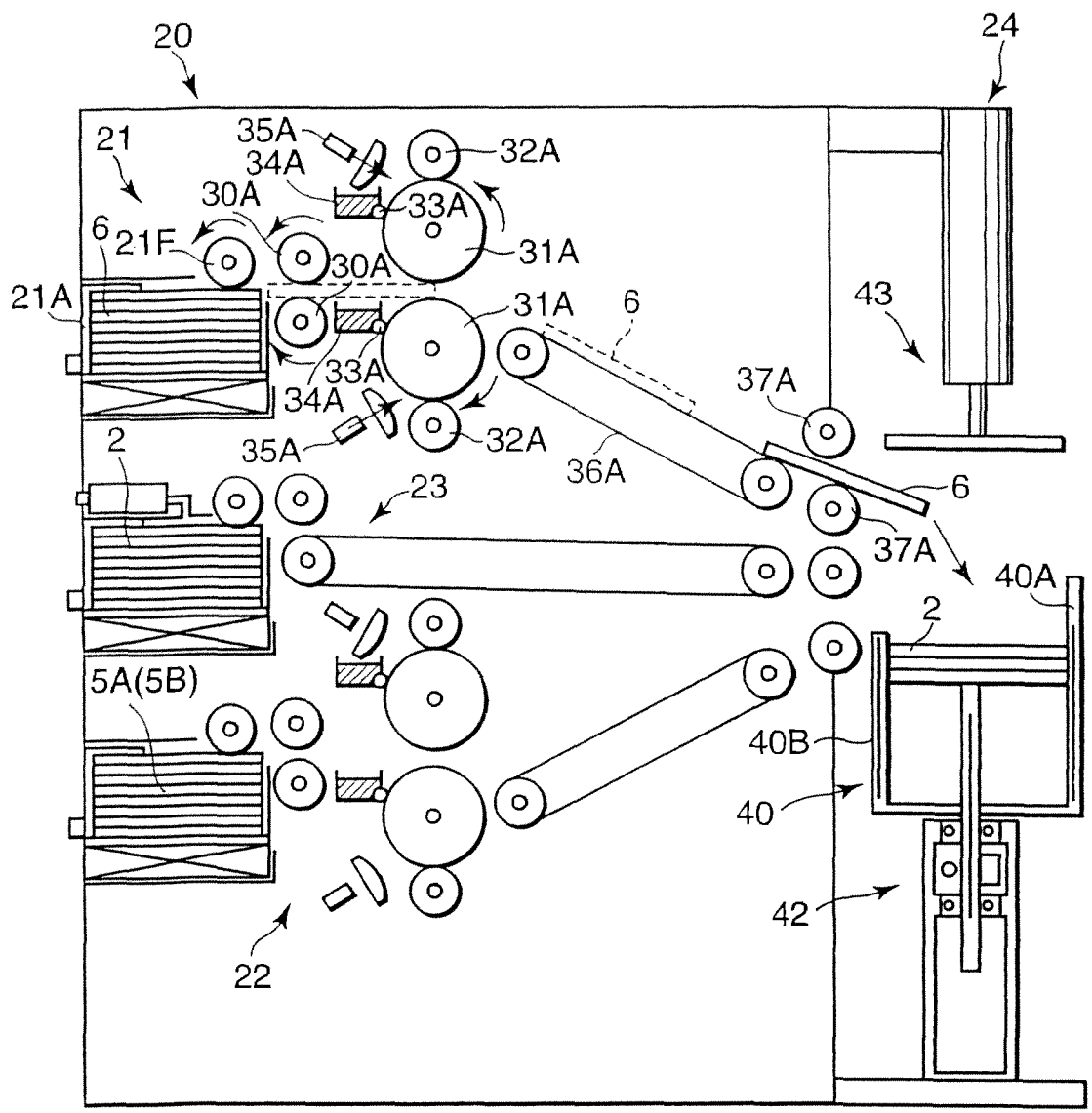
FIG. 7 is a schematic longitudinal sectional view of the fuel cell stack producing apparatus, illustrating an intermediate separator stacking operation.

Referring to FIG. 7, the fuel cell stack producing apparatus then operates the intermediate separator supply unit 21, and operates the send-out roller 21F to send out the uppermost intermediate separator 6 in the cassette 21A to the position between the pair of charging rollers 30A, positively charging the surface of the intermediate separator 6 by the charging roller 30A. On the other hand, at the photosensitive drums 31A, thermosetting adhesive powder is caused to adhere to the surfaces of the drums in a given pattern by the charging rollers 32A, the laser emitters 35A, and the powder rollers 33A. As shown in FIG. 4, both the upper surface and the lower surface of the intermediate separator 6 are bonded to MEAs 2. Thus, both the upper surface and the lower surface of the intermediate separator 6 are positively charged, and thermosetting adhesive powder is caused to adhere to both of the pair of photosensitive drums 31A.

As a result, regarding the intermediate separator 6 sent out from the pair of photosensitive drums 31A, thermosetting adhesive powder is caused to adhere to a given region surrounded by the seal groove 15 of the upper surface, exclusive of the cathode gas path 10B, and to a given region surrounded by the seal groove 15 of the lower surface, exclusive of the anode gas path 10A.

After thermosetting adhesive powder has been thus caused to adhere to the given portions of the upper surface and lower surface thereof, the intermediate separator 6 sent out from between the pair of photosensitive drums 31A is conveyed by the conveying belt 36A, and sent out to a position above the MEA 2 in the guide box 40 of the stack forming unit 24 through the gap between the pair of discharge rollers 37A installed in the opening of the case 25. At this time, the positioning protrusion 40A abuts the leading edge of the intermediate separator 6 to effect positioning on the intermediate separator 6.

When the intermediate separator 6 is placed on the MEA 2, the ascent/descent device 42 lowers the ascent/descent table 41 by a distance corresponding to the thickness of the intermediate separator 6. As a result, the upper surface of the intermediate separator 6 is supported at the same height as the upper surface of the MEA 2 shown in the figure.

Thereafter, the fuel cell stack producing apparatus alternately executes the operation of the MEA supply unit 23 shown in FIG. 6 and the operation of the intermediate separator supply unit 21 shown in FIG. 7 a given number of times to alternately layer MEAs 2 and intermediate separators 6 in the guide box 40. Each time one of these stack materials is stacked, the ascent/descent device 42 lowers the ascent/descent table 41 by a distance corresponding to the thickness of the stack material.

When the stacking of the MEAs 2 and the intermediate separators 6, effected a given number of times, is completed, the fuel cell stack producing apparatus operates the end separator supply unit 22 again. At this point in time, the end separator 5A is accommodated in the cassette 22A at the uppermost position. The fuel cell stack producing apparatus operates the send-out roller 22F, and sends out the end separator 5A to the position between the pair of charging rollers 30B, positively charging the surface of the end separator 5A by the charging rollers 30B.

At the photosensitive drums 31B, the charging rollers 32B, the laser emitters 35B, and the powder rollers 33B cooperate to cause thermosetting adhesive powder to adhere to the surfaces of the drum in a given pattern. As shown in FIG. 4, the surface of the end separator 5A bonded to an MEA 2 is the lower surface only. Thus, regarding the end separator 5B, the end separator supply unit 22 operates, of the charging rollers 30B and 32B, the photosensitive drums 31B, the powder rollers 33B, and the laser emitters 35B, provided in pairs, only those apparatuses situated on the lower side, causing thermosetting adhesive powder to adhere solely to the lower surface of the end separator 5A. Here, it is to a given region of the lower surface of the end separator 5A surrounded by the seal groove 15 of the lower surface, exclusive of the anode gas path 10A, that the thermosetting adhesive powder is caused to adhere.

The end separator 5A with thermosetting adhesive powder thus adhering to the given portion of the lower surface thereof is sent out through the gap between the pair of photosensitive drums 31B, and is conveyed by the conveying belt 36B before being sent out to a position above the MEA 2 in the guide box 40 through the gap between the pair of discharge rollers 37B.

Figure 8:
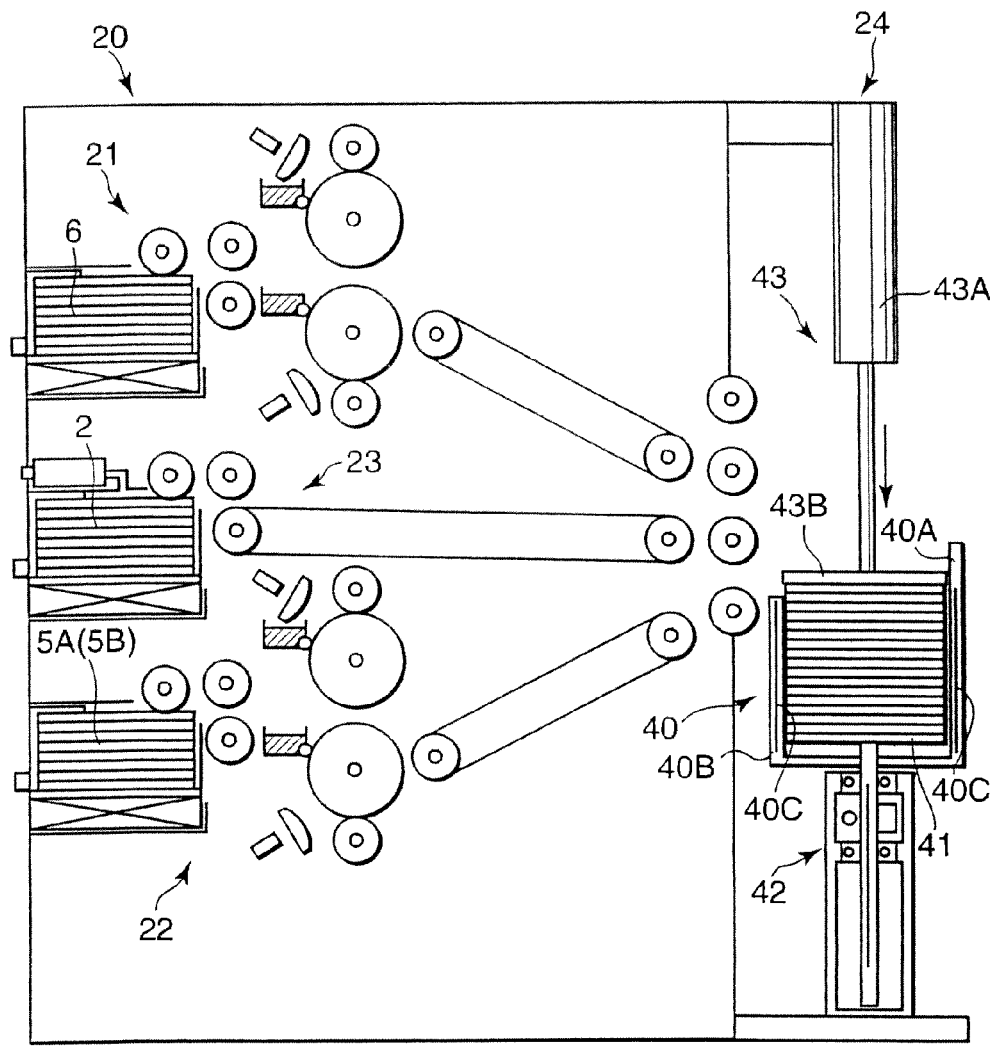
FIG. 8 is a schematic longitudinal sectional view of the fuel cell stack producing apparatus, illustrating a hot press.

Referring to FIG. 8, when all the stack materials have been stacked, the fuel cell stack producing apparatus turns on the heaters 40C to heat the stack materials in the guide box 40. When the stack materials have reached a given temperature, the air cylinder 43A is expanded, and the press head 43B is lowered to compress the stacked body.

As a result of this thermal compression, the thermosetting adhesive powder stacked between the stacked bodies is cured, and bonds the stacked bodies to each other, thereby forming a unitized fuel cell stack 1.

After that, the fuel cell stack producing apparatus contracts the air cylinder 43A to restore the press head 43B to the raised position and, at the same time, drives the ascent/descent device 42 to raise the ascent/descent table 41 to a position above the guide box 40. The fuel cell stack 1 raised to the position above the guide box 40 is removed from the stack forming unit 24, and is fastened together in the stacking direction in a device prepared as another unit by using end plates, bolts, and nuts.

The fuel cell stack producing apparatus repeatedly executes the above operation, thereby successively preparing fuel cell stacks 1.

While the above embodiment employs thermosetting adhesive powder for the bonding of the stack materials to each other, it is also possible to use a thermoplastic adhesive instead of thermosetting adhesive powder.

To enhance the adsorbing force of the photosensitive drums 31, it is also possible to mix magnetic particles called carriers into the thermosetting adhesive powder. However, depending on the material of the separators 5A, 5B, and 6, there is a possibility of the magnetic particles generating electric erosion. Thus, it depends on the material of the separators 5A, 5B, and 6 whether magnetic particles are to be mixed or not.

Instead of storing in the cassette 23A an MEA 2 in which a solid polymer electrolyte membrane 3 and a GDL 4 are integrated beforehand, it is also possible to individually supply these components to the guide box 40 from different cassettes, integrating them through thermal compression at the stack forming unit 24.

While solely the anode gas paths 10A and/or the cathode gas paths 10B are formed in the separators 5A, 5B, and 6, it is also possible to use separators in which coolant paths, and humidifying water paths are formed.

According to this fuel cell stack producing apparatus, it is possible to produce the fuel cell stack 1 at low cost while effecting positioning accurately on the stack materials by the guide box 40.

The contents of Japanese Patent Application No. 2004-150157, filed on May 20, 2004, will be incorporated herein by reference.

Next, a second embodiment of this invention will be described.

Figure 9:
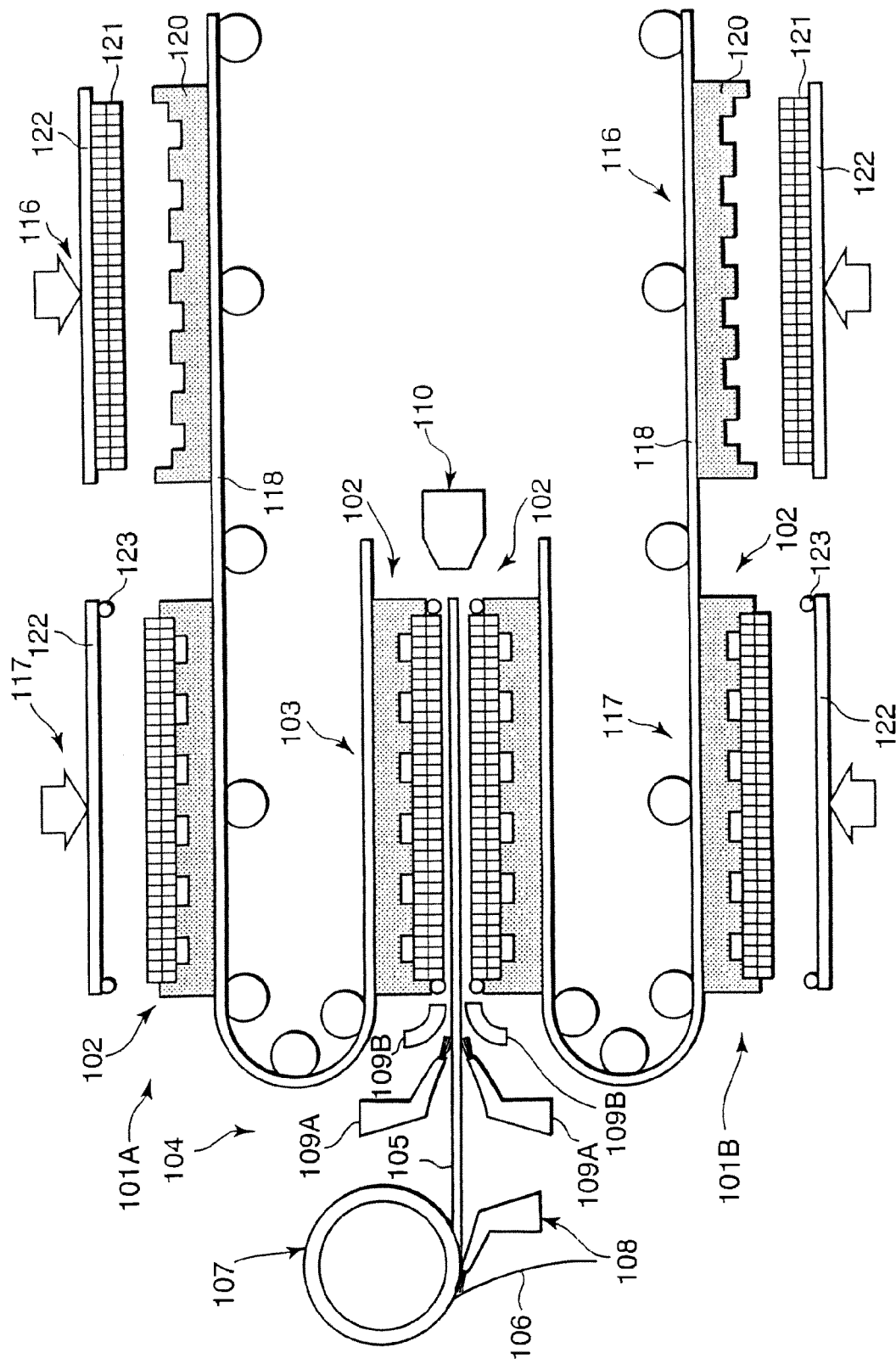
FIG. 9 is a schematic longitudinal sectional view of a fuel cell producing apparatus according to a second embodiment of this invention.

Referring to FIG. 9, a fuel cell producing apparatus according to this embodiment assembles a fuel cell by integrating with each other an electrolyte membrane 105, a pair of separators 120, and a pair of gas diffusion layers (GDL) 121 coated with catalyst layers.

The fuel cell producing apparatus is equipped with a pair of sub assembly lines 101A and 101B for integrating separators 120 and GDLs 121 into separator/GDL assemblies 102, an electrolyte membrane supply unit 105 for supplying an electrolyte membrane 104 between the pair of separator/GDL assemblies 102, and an integration unit 103 for holding the electrolyte membrane 104 between the pair of separator/GDL assemblies 102 and integrating them with each other.

One of the sub assembly lines 101A and 101B assembles the anode side separator/GDL assembly 102 of a fuel cell, and the other sub line assembles the cathode side separator/GDL assembly 102 of the fuel cell.

The sub assembly lines 101A and 101B are respectively equipped with separator conveyors 118. By performing processing on the separators 120 conveyed by the separator conveyors 118 at GDL bonding stages 116 and seal incorporating stages 117, the separator/GDL assemblies 102 are produced. Further, the separator conveyors 118 convey the completed separator/GDL assemblies 102 to the integration unit 103. Separators 120 are supplied to the separator conveyors 118 at fixed intervals.

The separator conveyors 118 are equipped with a retaining structure for retaining the separators 120 at given positions. In a possible retaining structure, grooves are formed in the front and rear side surfaces of the separators 120, and claws adapted to be engaged with these grooves are provided on the separator conveyors 118. In this case, the supply of the separators 120 to the separator conveyors 118 is effected by sliding the separators 120 from the sides toward the centers of the separator conveyors 118 while causing the claws of the separator conveyors 118 to enter the grooves of the separators 120. The removal of the completed fuel cell from the separator conveyors 118 is effected by sliding the separators 120 toward the sides of the separator conveyors 118.

It should be noted that FIG. 9 is a conceptual depiction of the fuel cell producing apparatus, and does not show the physical dimensions of the components thereof. For example, the radius of the bent portions of the separator conveyors 118 is much larger than the one as depicted in the drawing. Further, the bending angle is not restricted to 180 degrees.

The sub lines 101A and 101B are respectively equipped with jigs 122 at the GDL bonding stages 116 and the seal incorporating stages 117. The jigs 122 of the GDL bonding stages 116 grasp the GDLs 121, and bond the GDLs 121 to the separators 120 being conveyed by the separator conveyors 118. Adhesive is applied in advance to the surfaces of the separators 120 to be bonded to the GDLs 121, and, as a result of this operation, the separators 120 and the GDLs 121 are integrated. On the other hand, the surfaces of the GDLs 121 facing the jigs 122 are coated in advance through application, etc. with an electrolyte containing a catalyst constituting the anodes or cathodes.

The jigs 122 of the seal incorporating stages 117 grasp seal members 123. Adhesive is applied to the seal members 123 in advance. The jigs 122, situated on the outer side of the GDLs 121, bond the seal members 123 to the separators 120 being conveyed by the separator conveyors 118.

The separator conveyors 118 convey a pair of separator/GDL assemblies 102, thus assembled in the sub assembly lines 101A and 101B, to the integration unit 103 in a state in which they face each other.

On the other hand, the electrolyte membrane supply unit 104 is equipped with a roll 107 of an electrolyte membrane 105, a pair of conveying nozzles 109A for sending out the electrolyte membrane 105 from the roll 107 to the integration unit 103, a pair of rectifying plates 10913, a suction device 110, and a separation nozzle 108. The roll 107 is rotated by a servomotor.

The electrolyte membrane 105 is formed of a solid polymer electrolyte membrane, and is supplied to the fuel cell producing apparatus as the roll 107, with its surface being protected by a protective film 106. The protective film 106 prevents occurrence of problems due to coming into contact with each other of portions of the electrolyte membrane 105 when the electrolyte membrane 105 is rolled in a roll-shape, and serves to prevent a humidity deterioration of the electrolyte membrane 105 during conveyance or storage.

The pair of conveying nozzles 109A blow, against both surfaces of the electrolyte membrane 105 drawn out of the roll 107, conveyance airflows for guiding the electrolyte membrane 105 toward the integration unit 103. The pair of rectifying plates 109B rectify the conveyance airflows toward the integration unit 103. The suction device 110 sucks the conveyance airflows passed through the integration unit 103 together with the electrolyte membrane 105. As a result, the electrolyte membrane 105 is pulled under an appropriate tension to enhance the conveyance function for the electrolyte membrane 105, and the electrolyte membrane 105 is prevented from generating wrinkles or slack, maintaining the electrolyte membrane 105 in a desirable planar configuration.

By properly controlling the humidity of the conveyance airflows blown from the conveying nozzles 109A, it is possible to supply the electrolyte membrane 105 to the integration unit 103 while maintaining it to have a desirable moisture content.

The separation nozzle 108 ejects a removal airflow toward the interface between the electrolyte membrane 105 and the protective film 106 sent out from the roll 107 by the rotation of the servo motor and the airflows of the conveying nozzles 109A, and separates the protective film 106 from the electrolyte membrane 105. To facilitate intrusion of the protective film removal airflow into the interface between the electrolyte membrane 105 and the protective film 106, the forward end of the separation nozzle 108 is set so as to be directed toward the curved portion of the roll 107. Preferably, proper humidity control is also performed on the protective film removal airflow to supply a high quality electrolyte membrane 105 to the integration unit 103.

As shown in the drawing, the protective film removal airflow ejected from the separation nozzle 108 is in a direction opposite to the direction in which the electrolyte membrane 105 is sent out. Thus, the protective film removal airflow imparts an appropriate tension to the electrolyte membrane 105 sent out toward the integration unit 103, thereby preventing generation of slack.

In the above-described construction, the electrolyte membrane supply unit 104 gradually feeds the electrolyte membrane 105 from the roll 107 toward the integration unit 103. During the operation of the integration unit 103, the electrolyte membrane supply unit 104 does not feed the electrolyte membrane 105. Thus, the feeding of the electrolyte membrane 105 is effected intermittently in conformity with the operation of the integration unit 103. Also regarding the pair of separator conveyors 118, the conveyance of the separators 120 is not performed during the operations of the GDL bonding stages 116, the seal incorporating stages 117, and the integration unit 103. In view of this, the operations of the GDL bonding stages 116, the seal incorporating stages 117, and the integration unit 103 are performed in synchronism with each other.

The integration unit 103 bonds the separator/GDL assemblies 102 conveyed by the pair of separator conveyors 118, to given positions of the electrolyte membrane 105 conveyed therebetween. For this purpose, the integration unit 103 is equipped with a press-fitting jig for press-fitting the separator/GDL assemblies 102 to the electrolyte membrane 105 and a cutter for cutting the electrolyte membrane 105.

After causing the electrolyte membrane 105 to enter the gap between the pair of separator/GDL assemblies 102 by the electrolyte membrane supply unit 104, the integration unit 103 drives the press-fitting jig to press-fit the pair of separator/GDL assemblies 102 to the electrolyte membrane 105. Further, the cutter is driven to cut the electrolyte membrane 105 between the rectifying plates 109B and the integration unit 103. The surfaces of the GDLs 121 are coated with electrolyte, and the electrolyte is brought into close contact with the bonding surfaces of the GDL 121 and the electrolyte membrane 105 without leaving any gap by the pressing force of the press-fitting jig, integrating the separator/GDL assemblies 102 with the electrolyte membrane 105. It is also desirable to provide a heating device along with the press-fitting jig.

In this fuel cell producing apparatus, a pair of separator/GDL assemblies 102 are produced synchronously in the sub assembly lines 101A and 101B, and are conveyed synchronously to the integration unit 103 by the separator conveyors 118. The feeding of the electrolyte membrane 105 by the electrolyte membrane supply unit 104 is effected in synchronism with the conveyance of the separator/GDL assemblies 102 by the separator conveyors 118. Thus, the electrolyte membrane supply unit 104 alternately repeats the feeding of the electrolyte membrane 105 for one span and the standby during the processing at the GDL bonding stages 116, the seal incorporating stages 117, and the integration unit 103.

The electrolyte membrane supply unit 104 on standby stops the servo motor driving the roll 107, and retains the electrolyte membrane 105, with its leading edge slightly protruding toward the integration unit 103 from between the rectifying plates 109B, by the conveyance airflows blown out of the conveying nozzles 109A. When feeding the electrolyte membrane 105, the roll 107 is rotated by the servomotor. Then, the electrolyte membrane 105 is fed to the integration unit 103 while maintaining a given tension due to the conveying nozzles 109A and the suction device 110. Preferably, the electrolyte membrane 105 is not fed for one span at one time, but is intermittently fed between the separator/GDL assemblies 102. The electrolyte membrane 105 fed between the separator/GDL assemblies 102 is maintained in a non-contact state with respect to the separator/GDL assemblies 102 on both sides by the conveyance airflows blown out of the conveying nozzles 109A until the jig press-fits the separator/GDL assemblies 102.

Figure 10:
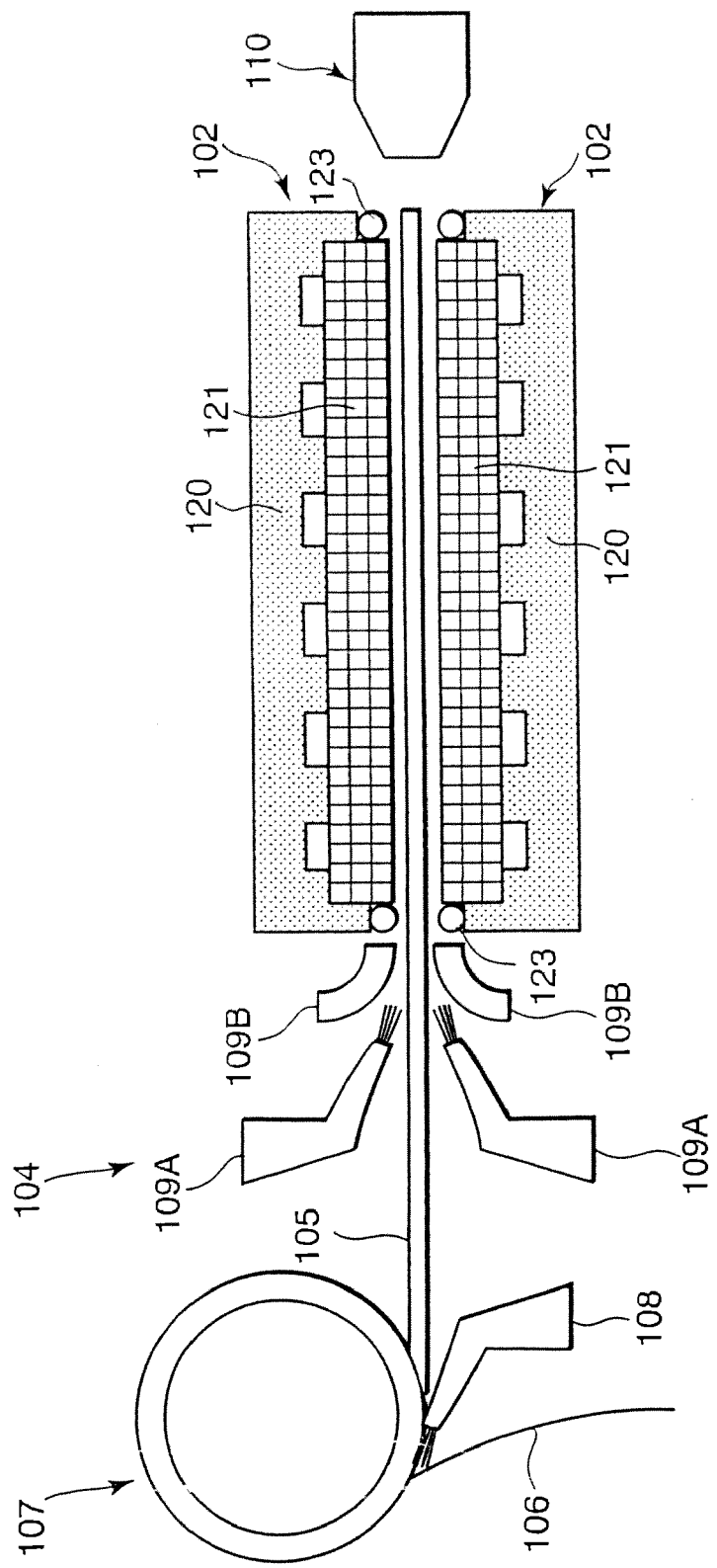
FIG. 10 is an enlarged view of a main portion of FIG. 9.

After the total intrusion of the electrolyte membrane 105 into the gap between the separator/GDL assemblies 102 as shown in FIG. 10, the jig press-fits the separator/GDL assemblies 102 to the electrolyte membrane 105.

By repeating the above process, fuel cells are completed successively. The completed fuel cells are successively conveyed to a place for storage.

While in this embodiment the electrolyte membrane 105 is held between the separator/GDL assemblies 102, this invention is also applicable to a case in which the electrolyte membrane 105 is held solely between the pair of GDLs 121, with the separators 120 being excluded.

As described above, in this fuel cell producing apparatus, the electrolyte membrane 105 is fed by the conveyance airflows ejected from the conveying nozzles 109A, so that it is possible to prevent generation of a flaw on the electrolyte membrane 105 and adhesion of foreign matters thereto. Further, the conveyance airflows impart an appropriate tension to the electrolyte membrane 105 being fed, making it possible to prevent generation of wrinkles and slack in the electrolyte membrane 105. Thus, it is possible to supply the electrolyte membrane 105 to the integration unit 103 in a desirable state.

The contents of Japanese Patent Application No. 2003-391044 with a filing date of Nov. 20, 2003, are herein incorporated by reference.

Although the invention has been described above by reference to certain embodiments of the invention, the invention is not limited to the embodiments described above. Modifications and variations of the embodiments described above will occur to those skilled in the art, within the scope of the claims.

FIELD OF THE INDUSTRIAL APPLICABILITY

As described above, according to this invention, the stack materials are stacked by using a guide box, so that it is possible to effect positioning accurately on the stack materials with a simple construction. Further, it is possible to produce a fuel cell stack at low cost. This invention provides a desirable effect especially when applied to the production of a solid polymer type fuel cell stack.

The embodiments of this invention in which an exclusive property or privilege is claimed are defined as follows:

1. A method of producing a fuel cell stack comprising multiple stack materials stacked in a given order, the production method comprising:
   a process for stacking the stack materials in the given order in a guide box through intermediation of an adhesive to be solidified through heating; and
   a process for integrating the stack materials by heating and compressing the stack materials stacked in the guide box,
   wherein the multiple stack materials comprise a membrane-electrode assembly which causes a power generating reaction in response to a gas supply, and separators having gas paths formed thereon, for supplying the gas to the membrane-electrode assembly, and
   the method further comprises a process for feeding the membrane-electrode assembly and the separators to the guide box, separately.

2. The production method as defined in claim 1, wherein the process for stacking comprises a process for holding, between the separators to surfaces of which the adhesive is applied, the membrane-electrode assembly to which no adhesive is applied.

3. The production method as defined in claim 2, further comprising a process for humidifying the membrane-electrode assembly.

4. The production method as defined in claim 2, further comprising a powder adhesion process for causing electrically charged powder of the adhesive to adhere to the surfaces of the separators, which are electrically charged in an opposite polarity.

5. The production method as defined in claim 4, wherein the powder adhesion process further comprises a process for causing the powder of the adhesive to adhere to the surfaces of the separators via a photosensitive drum adsorbing the powder of the adhesive thereon in a given charging pattern.

6. The production method as defined in claim 2, wherein the separators comprise an intermediate separator having the gas paths formed on both sides, and end separators having the gas paths formed only one side thereof, and wherein the process for stacking comprises a process for initially stacking the end separators in the guide box and a process for finally stacking the end separators in the guide box.

7. The production method as defined in claim 1, wherein the process for stacking further comprises a process for lowering a support position for the stack materials stacked in the guide box in correspondence with an increase in thickness of the stack materials stacked in the guide box.

8. An apparatus for producing a fuel cell stack comprising multiple stack materials stacked in a given order, the apparatus comprising:
   a guide box that stacks the stack materials in the given order through intermediation of an adhesive to be solidified through heating; and
   a mechanism that heats and compresses the stack materials stacked in the guide box,
   wherein the multiple stack materials comprise a membrane-electrode assembly which causes a power generating reaction in response to a gas supply, and separators having gas paths formed thereon, for supplying the gas to the membrane-electrode assembly, and
   the apparatus further comprises a mechanism for feeding the membrane-electrode assembly and the separators to the guide box, separately.

9. The producing apparatus as defined in claim 8, further comprising a stack material supply unit that alternately supplies the stack materials to surfaces of which the adhesive is applied and the stack material to a surface of which no adhesive is applied, to the guide box.

* * * * *